US008442559B1

(12) United States Patent
Zang et al.

(10) Patent No.: US 8,442,559 B1
(45) Date of Patent: May 14, 2013

(54) METHODS AND SYSTEMS FOR PAGING IN A COMMUNICATION SYSTEM

(75) Inventors: Hui Zang, Burlingame, CA (US); Jean C. Bolot, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 832 days.

(21) Appl. No.: 12/204,041

(22) Filed: Sep. 4, 2008

(51) Int. Cl.
*H04W 68/00* (2009.01)

(52) U.S. Cl.
USPC ........ 455/458; 455/440; 455/446; 455/456.1; 455/429

(58) Field of Classification Search .................. 455/458, 455/456.1, 429, 430, 438, 440, 515
See application file for complete search history.

(56) References Cited

U.S. PATENT DOCUMENTS

| | | | |
|---|---|---|---|
| 5,875,400 A | 2/1999 | Madhavapeddy et al. | |
| 5,983,109 A | 11/1999 | Montoya | |
| 6,181,945 B1 | 1/2001 | Lee | |
| 6,400,943 B1 | 6/2002 | Montoya | |
| 6,594,493 B1 * | 7/2003 | Davies et al. | 455/436 |
| 7,031,731 B2 | 4/2006 | Gau et al. | |
| 7,194,276 B2 * | 3/2007 | Bejerano et al. | 455/458 |
| 7,489,936 B1 * | 2/2009 | Liu | 455/456.1 |
| 2003/0134649 A1 | 7/2003 | Gau et al. | |
| 2006/0025161 A1 * | 2/2006 | Funato et al. | 455/458 |
| 2006/0058038 A1 * | 3/2006 | Das et al. | 455/456.1 |
| 2006/0058056 A1 * | 3/2006 | Das et al. | 455/524 |
| 2006/0068802 A1 | 3/2006 | Benco et al. | |
| 2006/0116124 A1 | 6/2006 | Signore et al. | |
| 2006/0252441 A1 * | 11/2006 | Harris et al. | 455/518 |
| 2007/0191054 A1 * | 8/2007 | Das et al. | 455/525 |
| 2007/0207811 A1 * | 9/2007 | Das et al. | 455/450 |
| 2008/0102789 A1 * | 5/2008 | Sung | 455/406 |
| 2008/0254814 A1 * | 10/2008 | Harris et al. | 455/458 |
| 2009/0042587 A1 * | 2/2009 | Kamdar et al. | 455/458 |
| 2010/0004001 A1 * | 1/2010 | Tao et al. | 455/456.1 |
| 2010/0087210 A1 * | 4/2010 | Lee et al. | 455/458 |

OTHER PUBLICATIONS

Hui Zang, et al., "Mining Call and Mobility Data to Improve Paging Efficiency in Cellular Networks," Sep. 9-14, 2007, 12 pages, MobiCom, Montreal, Quebec, Canada.
U.S. Appl. No. 10/438,563, filed May 14, 2003.
U.S. Appl. No. 11/499,518, filed Aug. 4, 2006.
U.S. Appl. No. 11/810,665, filed Jun. 6, 2007.
U.S. Appl. No. 11/646,927, filed Dec. 27, 2006.

* cited by examiner

*Primary Examiner* — Kamran Afshar
*Assistant Examiner* — Mong-Thuy Tran

(57) ABSTRACT

Disclosed herein is a method of operating a communication system, wherein the method comprises receiving entity historical performance information including a paging delay value and a paging cost value for each of a plurality of past call periods; receiving target performance information indicating a paging delay goal and a paging cost goal; processing the historical performance information and the target performance information to determine a past call period wherein the past call period comprises one of the plurality of past call periods having a paging delay value that is within a predetermined proximity of the paging delay goal and a paging cost value that is within a predetermined proximity of the paging cost goal; processing call history information associated with the entity to determine a plurality of locations where the entity was located during the past call period; receiving a call for the entity; and in response to the call, transferring a plurality of paging messages to page the entity at the plurality of locations.

23 Claims, 10 Drawing Sheets

METHODS AND SYSTEMS FOR PAGING IN A COMMUNICATION SYSTEM

TECHNICAL BACKGROUND

When a wireless communication network receives a communication (voice or data including but not limited to audio, video, internet, etc.) for a particular wireless device, the network sends out a page in an attempt to connect to the device. Paging a wireless device incurs network bandwidth costs, however. So, it is desirable to know precisely where the device is when a page is to be sent so that the device can be contacted with a limited number of pages via a small set of base stations, if not a single, precise page via a single base station.

Such knowledge also comes with an associated bandwidth cost since the only way to know where the device is at all times is to frequently update the network with the location of the device. But, this diminishes the battery life of the device, requiring more frequent recharging and increasing the likelihood that the device user will be found with a temporarily unusable device.

Alternatively to maintaining a continuous connection between the network and a device, the network could page every network base station when paging a device. Obviously, with universal base station paging, the network would incur a great bandwidth cost.

To reduce the paging cost associated with paging a device wireless communications service providers have adopted various strategies. Each of these strategies results in an increase in paging delay—the delay in connecting an intended call recipient to an incoming call—compared to the two paging methods previously mentioned (pages directed to specific cells because of precise location knowledge or universal cell paging). Paging delay is incurred when subsequent rounds of paging are required to reach a user after an initial round of paging. For example, there will be little to no delay with universal paging because every base station is paged during the initial round of paging, thereby guaranteeing that the mobile will be located. However, this will incur large bandwidth costs. In contrast, there typically will be much delay if only a single base station is paged during each round of paging, because the likelihood of reaching the user each round is low. However, this will incur little bandwidth cost. Thus, there is an inherent tradeoff that exists between paging costs and paging delay.

A certain amount of paging delay is tolerable, but as paging delay increases, customer satisfaction decreases as an increasing number of calls get switched to voice mail or the caller hangs up without any connection being made.

Communications service providers thus find it desirable to balance paging costs versus paging delays when operating a communications system.

OVERVIEW

Disclosed herein is a method of operating a communication system, wherein the method comprises receiving entity historical performance information including a paging delay value and a paging cost value for each of a plurality of past call periods; receiving target performance information indicating a paging delay goal and a paging cost goal; processing the historical performance information and the target performance information to determine a past call period wherein the past call period comprises one of the plurality of past call periods having a paging delay value that is within a predetermined proximity of the paging delay goal and a paging cost value that is within a predetermined proximity of the paging cost goal; processing call history information associated with the entity to determine a plurality of locations where the entity was located during the past call period; receiving a call for the entity; and in response to the call, transferring a plurality of paging messages to page the entity at the plurality of locations.

There is also included herein a further disclosure of a communications system comprising an interface and a processing system comprising a storage system and software for directing operation of the processing system, wherein the interface is configured to receive historical performance information for an entity, wherein the historical performance information includes a paging delay value and a paging cost value for each of a plurality of past call periods; and to receive target performance information indicating a paging delay goal and a paging cost goal, and wherein the processing system is configured to process the historical performance information and the target performance information to determine a past call period, wherein the past call period comprises one of the plurality of past call periods having a paging delay value that is within a predetermined proximity of the paging delay goal and a paging cost value that is within a predetermined proximity of the paging cost goal, to process call history information associated with the entity to determine a plurality of locations where the entity was located during the past call period, to receive a call for the entity; and in response to the call, to transfer a plurality of paging messages to page the entity at the plurality of locations.

DETAILED DESCRIPTION

Figure 1:
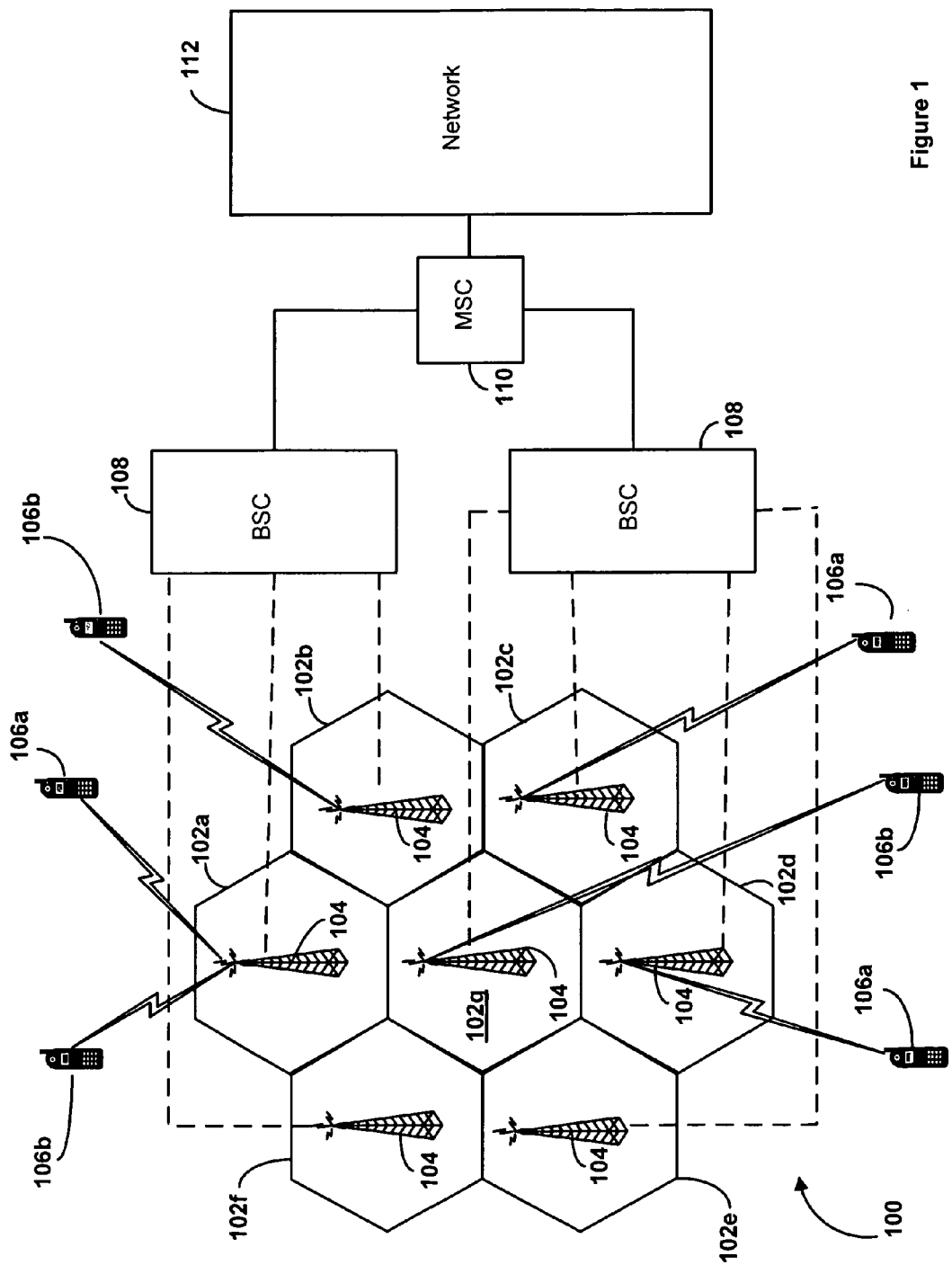
FIG. 1 is a schematic diagram illustrating a communications network in which the embodiments disclosed herein may be used.

Referring now to FIG. 1, a simplified diagram of a wireless telecommunications network 100 in which the various exemplary embodiments and their equivalents of the present invention can be employed is provided. As shown in FIG. 1, such a network 100 includes multiple cells 102a-102g. Each cell 102 includes a base transceiver station 104. It will be understood that the hexagonal configuration of the cells 102 as shown in FIG. 1 are merely representative of an idealized coverage area of the cells. Actual cells vary widely in size and shape due to variations in environmental factors (for example, geographical features such as hills and valleys) and manmade obstructions (such as buildings or terrain alterations). Additionally, as a practical matter, some overlap in the coverage area between the cells is required to hand off mobile stations that may be moving between the various cells.

Also seen in the Figure are mobile stations 106a and 106b. The mobile stations may be standard wireless telephones, personal digital assistants, or any other device capable of a wireless connection to the base transceiver stations 104. As represented in the Figure, each mobile station may, due to the movement of its user, find itself in communication with one or more of cells 102a-g and their respective base stations 104 during the course of any particular time period. Thus, mobile station 106a is shown in communication with the base stations 104 of cells 102a, 102c, and 102d while mobile station 106b is shown in communication with the base stations 104 of cells 102a, 102b, and 102g. It will be understood that the mobile stations will typically not be in simultaneous communication with more than once of the cells 102a-102g at any one time except during hand-offs from one cell to another.

Each base transceiver station 104 communicates with a base station controller (BSC) 108. Controller 108 in turn communicates with a gateway element, or a mobile switching center (MSC) 110. The switching center 110 is itself in communication with a network 112. The network 112 may be a public switched telephone network or the Internet for instance. Other, alternative communication arrangements between the controller 108 and network 112 may also be utilized as well.

It will also be understood that the representation of the cells 102a-102g is meant to be illustrative in number only. The actual numbers of cells associated with a base station controller 108 may vary from locale to locale and from service provider to service provide, just as the number of base station controllers 108 associated with a master switching center 110 may likewise vary.

Similarly, illustrating the mobile stations as being in communication with three of the represented cells is also meant to be representative only. It will be understood that any mobile station may communicate with only a single cell or many more than three during a predefined time period, depending upon the mobile station owner's usage and travel patterns.

It will be further understood, of course, that the foregoing wireless communication system 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner and location.

Figure 2:
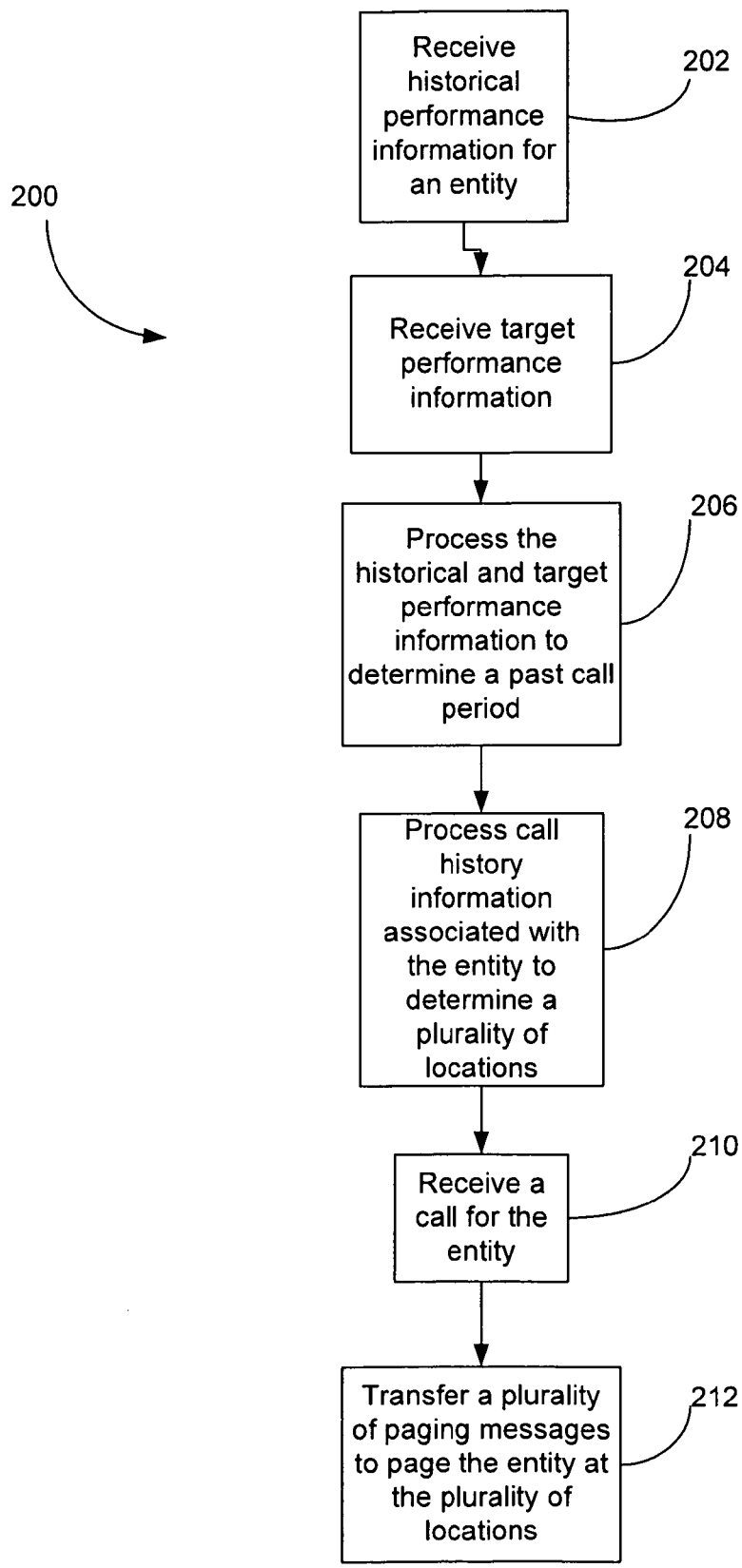
FIG. 2 is a flow diagram illustrating an embodiment of a method for operating a communication system in accord with an embodiment disclosed herein.

FIG. 2 illustrates an embodiment 200 of a method for operating a communication system. At step 202 a communication system receives historical performance information for an entity. An "entity," as used herein, includes an individual customer, an individual mobile station, a geographical market, a corporate or other business entity, or any other possible grouping of telecommunication customers. An "entity" also includes plurals of the formerly mentioned examples. For example, many service providers currently provide family plans where multiple mobile stations are grouped under a single account number. An entity may consist of a single mobile station or all of the mobile stations under that account. Additionally, a market may comprise a particular geographical area not defined by political boundaries, such as all mobile stations having billing addresses within a single or multiple zip or area codes or or may include political entities such as cities, counties, or states that do have particular legal geographic boundaries. Furthermore, "entity" may include corporations or other business entities that can be categorized into particular market segments. Thus, an entity may include any number of mobile stations grouped into any particular category as desired by the communication system operator.

"Historical performance information," as used herein, includes paging cost and paging delay, as well as any other information deemed relevant by a particular communication system service operator.

"Paging cost" as used herein is the total number of cells paged in an attempt to reach the call recipient. This number may be divided into one or more separate attempts to page the call recipient.

"Paging delay" as used herein is the delay calculated from the time a call termination request arrives at the base station (BSC) until the time a reply is received by the BSC from the mobile station containing its cell location. Paging delay directly affects the caller's experience and it should be kept as low as possible. If the paging delay is too long, the caller party may hang up.

The historical performance information received at step 202 will be for a plurality of previous call periods. Generally, an analysis of call recipient movement patterns indicates that past call history can be used to provide a measure of predictability of the locations where a call recipient may be found in the future. As a usual matter, call recipient movement data becomes more predictive as more data is analyzed up to a point. That is, it has been found that location predictability based upon past call recipient movements will rapidly increase and then plateau, thus making the analysis of older data less valuable. Further information on such forms of analysis can be found in a paper entitled "*Mining Call and Mobility Data to Improve Paging Efficiency in Cellular Networks*" written by the present inventors, incorporated herein by reference, and attached hereto as part of the Information Disclosure Statement filed herewith.

A call period may be a time span of a predetermined length such as an hour, day, week, etc. Alternatively, the call period may be a specific time period during the day, such as 7:00 am to 6:00 pm or 6:00 pm to 10:00 pm by way of example only. The past call period information received at step 202 will be for a number of multiples of the predetermined time span. That is, if the predetermined length is one day, then one of the previous call periods will be for one day, another will be for 2 days, inclusive of the first day's worth of call information; a third for 3 days, inclusive of the first two days worth of call information, and so on. As noted above, the value of continuing to add older call recipient movement data will eventually diminish for each entity, though such point of diminishing value may vary depending upon the particular entity.

Furthermore, analysis of the historical performance information may indicate particular time frames that do not aid predictability of call recipient location versus another time frame. That is, one call recipient may live a substantial distance from work and make and receive all calls within a single cell during work hours, yet may make a receive calls in multiple different cells after work hours while performing errands, driving to and from children's sporting events or other activities, visiting friend or recreating. Weekend movement patterns versus weekday movement patterns may also indicate different cell locations for a particular entity. Thus, the call period can be defined as required to provide the predictability desired for a particular entity receiving a call at a particular time.

At step 204 the communication system receives target performance information indicating a paging delay goal and a paging cost goal. These goals may be desired targets for the particular communication system as a whole, or a geographic or political subdivision served by the network, or for the entity itself. That is, the operators of the communication system may set specific targets or target ranges for both the paging delay and the paging cost. These goals can vary from entity to entity or geographical region to geographical region or political subdivision to political subdivision. For example, it may be desirable to establish different goals in a rural area serving fewer customers as compared to an urban area. By way of another example, it may be desirable to establish different goals for an important customer of the service provider, such as a large corporation, where a reduced paging delay may be part of the offered service. Thus, the paging delay goals and the paging cost goals may be established as desired by the service provider and may vary from customer to customer, location to location, or political subdivision to political subdivision.

At step 206 the historical performance information and the target performance information are processed to determine a past call period for the entity having a paging delay value that is within a predetermined proximity of the paging delay goal and a paging cost value that is within a predetermined proximity of the paging cost goal. It will be understood that the desired level of proximity can vary from entity to entity depending upon location or type of entity or any other factor deemed relevant in operating a communication system. "Proximity" can be variously determined, such as being within a certain percentage of a desired goal and can be defined differently for the paging delay versus the paging cost.

The past call period identified at step 206 may vary from entity to entity. That is, the past call period for Entity A may be 7 days of historical performance information while the past call period for Entity B may be 10 days of historical performance information. The embodiment disclosed in FIG. 2 as well as other embodiments disclosed herein contemplate using varying number of call periods from entity to entity, however "call period" is defined by the communication system operator.

After identifying a past call period at step 206 that has a desired proximity to the paging cost and paging delay goals, then the call history information for the entity for that call period will be analyzed at step 208. The call history information will include the location(s) where the entity received calls during the call period in question.

At step 210 the communication system receives a call for the entity and at step 212 transfers a plurality of paging messages to page the entity at the location(s) identified in step 208.

In this manner, then, an operator may wish to operate the communication system in an effort to achieve the paging cost and paging delay goals it establishes. It does so by identifying past call periods where attempts to reach a call recipient satisfied the paging cost and paging delay goals established for that entity by the communication system operator. An additional benefit of the operation of a communication system in this manner is that it may be utilized to reduce the bandwidth required for paging, thus improving the robustness of the system against denial of service attacks.

Figure 3A:
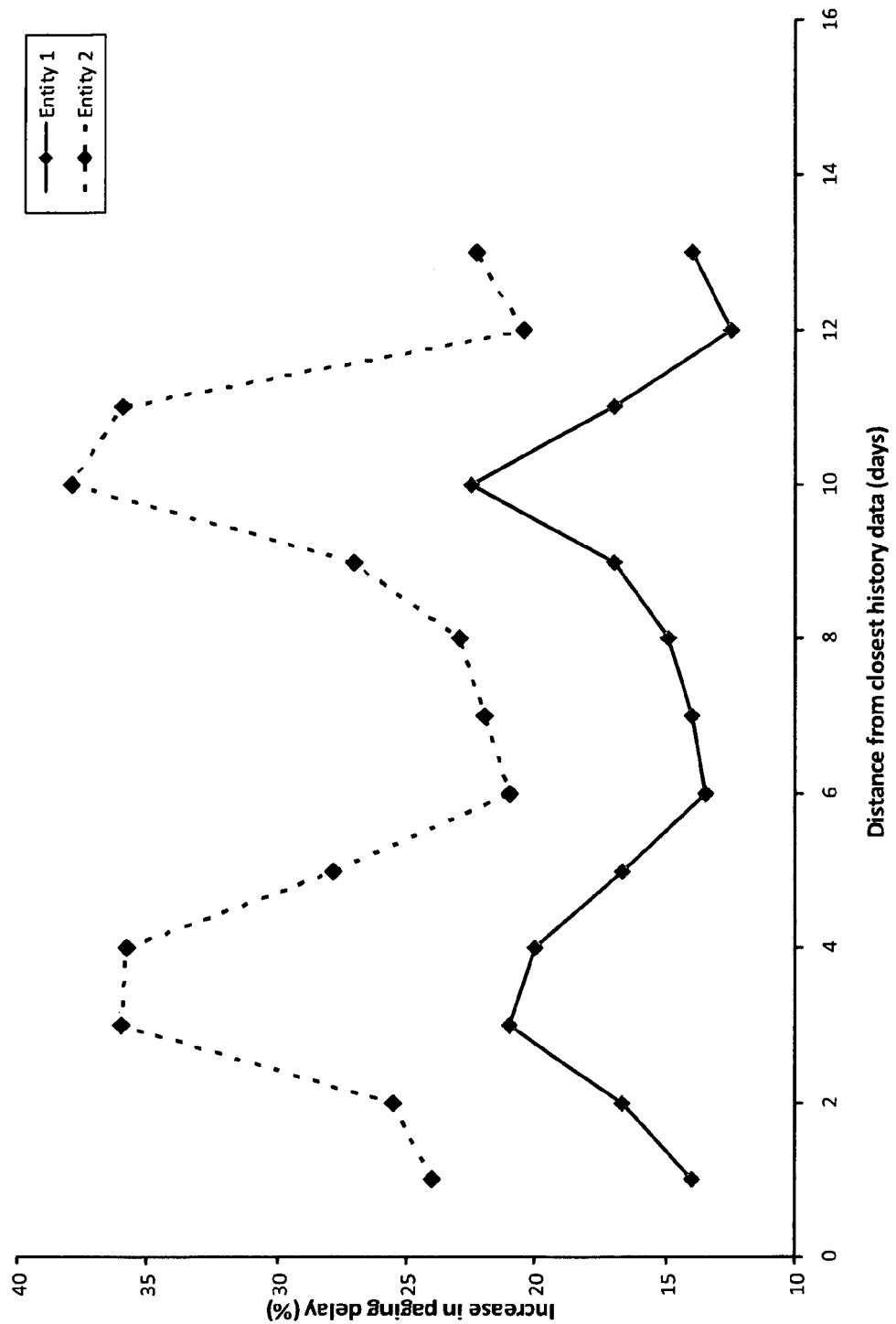
FIGS. 3a and 3b are graphical representations illustrating the effect of including ever larger call histories and its effect on paging costs and paging delays for a pair of entities.
Figure 3B:
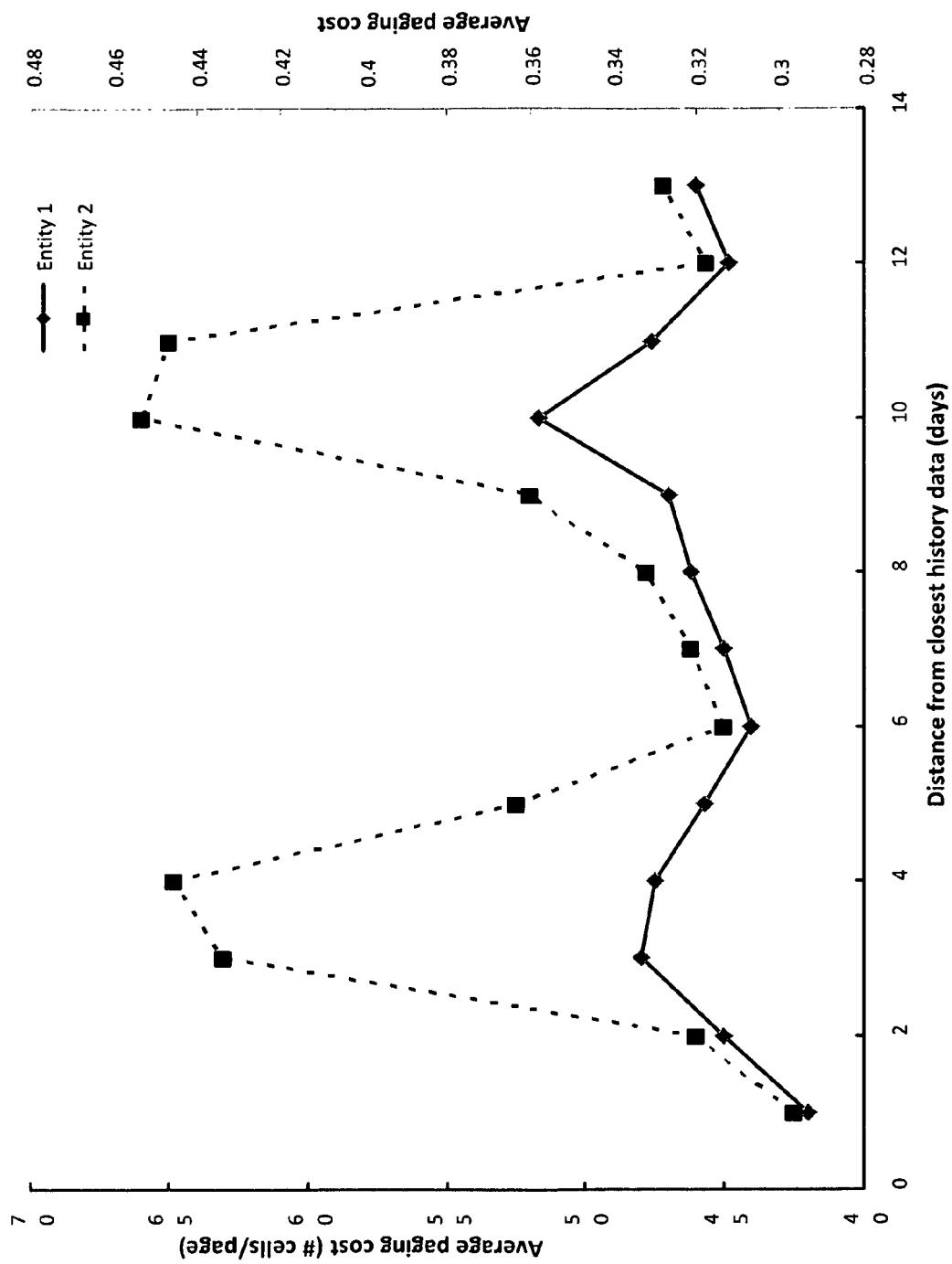
Figure 4:
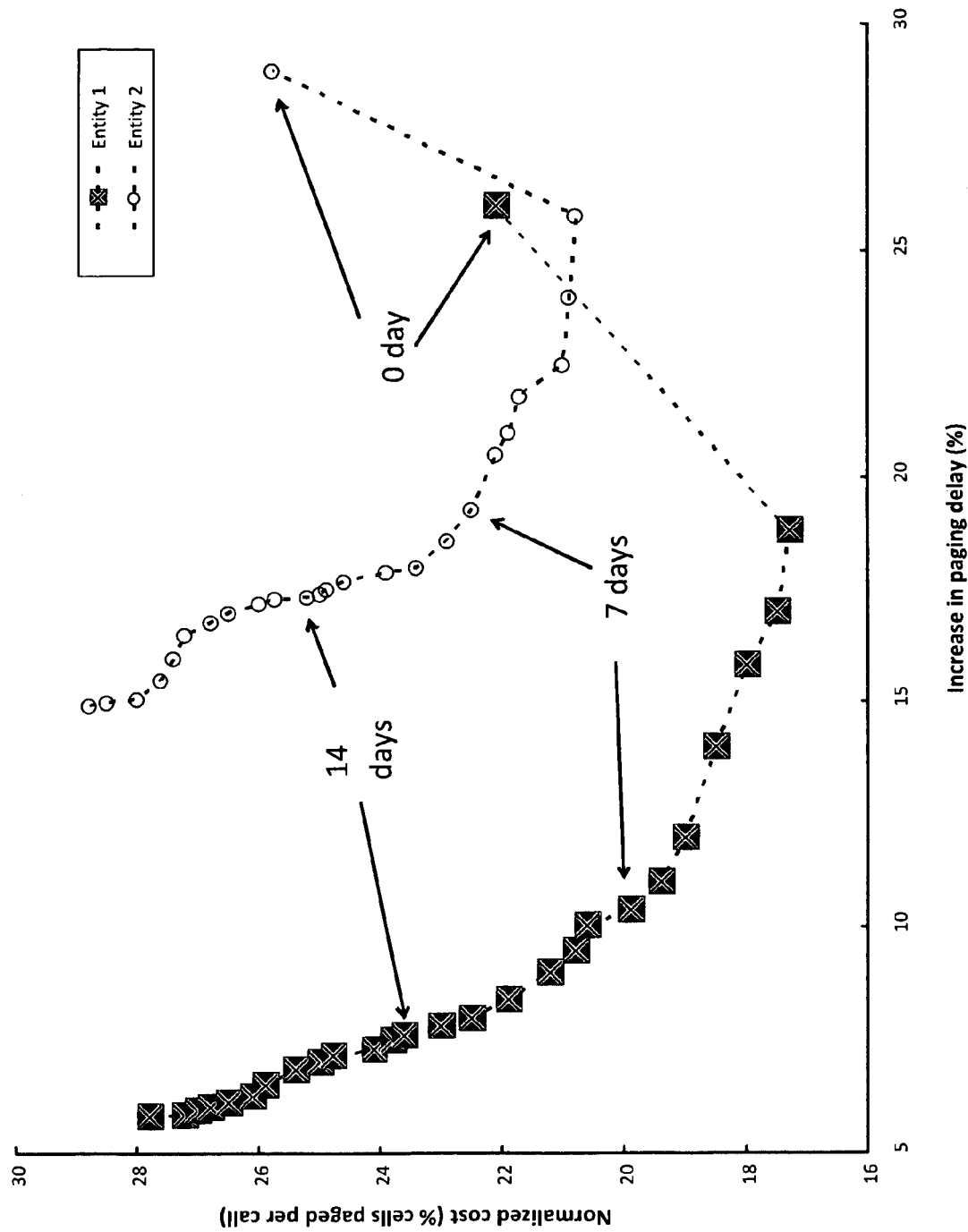
FIG. 4 is a graphical representation illustrating the effect of including ever larger call histories and its effect on paging costs and paging delays for a pair of entities.

FIGS. 3a, 3b, and 4 provide graphical illustrations of the concepts discussed relative to FIG. 2. It should be understood that these graphs are meant to be representative only and only depict possible results expected from implementation of the embodiments shown herein.

As seen in FIG. 3a the increase in paging delay is plotted against the distance from the closest history data for two entities. The graph illustrates how the paging delay can differ for different entities. It will be observed that the graph further indicates a cyclical fluctuation over a five versus two day time period, which would coincide with a five day work week and two consecutive days off, weekends or otherwise depending upon a particular entity's work schedule. The graph thus shows that work days correlate better and provide a reduction in paging delay compared to including the non-work days within the data set being evaluated. Stated otherwise, the graph indicates how work day data is not necessarily predictive of non-work day location and vice-versa, thus resulting in an increase in the paging delay when the data for work versus non-work days are included. Inclusion of such data is within the discretion of the communication system operator or it may be used to develop distinct time based profiles as discussed below with regard to FIG. 6.

FIG. 3b shows a plot of the average paging cost plotted against the distance from the closest history data.. Once again, the same cyclical fluctuation is apparent as was seen in FIG. 3a. As shown, once again, the work day data is not necessarily predictive of non-work day locations, thus resulting in large increases in the paging costs for the non-work day paging. As with FIG. 3a, inclusion of such data is within the discretion of the communication system operator or it may be used to develop distinct time based profiles as discussed below with regard to FIG. 6.

FIG. 4 illustrates how increasing the call history data for a pair of entities results in a continuing decrease in paging delay—because more and more locations will be included in the initial page—while the paging costs increases as more and more cells are paged. Each of the data points in the chart represents the effect of including a certain number of days of caller history in the analysis of paging cost and paging delay. The only "dip" that occurs with respect to either entity is when there are no days of history included versus considering one day of past caller history in determining which cells to page.

FIG. 4 further illustrates how a communication system operator can use such data. For example, if an operator determined a desired paging delay goal was within a range of 10 to 20 percent and cost was within the range of 20 to 24 percent, then the system operator may determine that it should store 8 days of recent caller history for Entity 1 and use that history to determine paging locations, while 5 to about 12 days of caller history may be stored for Entity 2. The exact number of days stored for each entity can be determined by precise criteria developed by the operator based upon considerations it deems appropriate for its system.

As shown then with regard to the FIGS. 2-4, each entity however defined by the communication system operator may be treated individually to accomplish the desired balancing of paging cost and paging delay to achieve whatever goal is set by the system.

Figure 5:
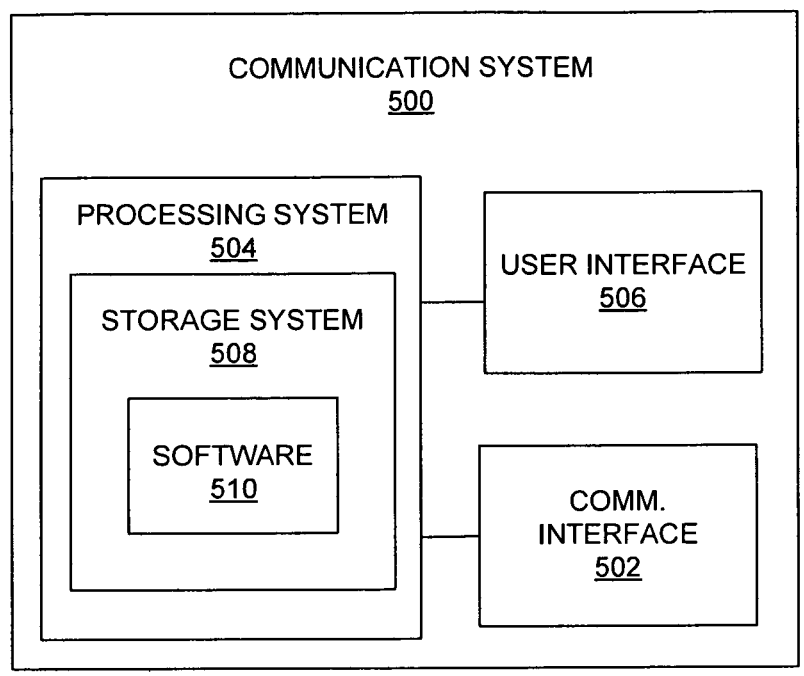
FIG. 5 is a block diagram illustrating a communications system in an embodiment.

Referring to FIG. 5, a communications system 500 in which the embodiments disclosed herein may find application is illustrated. System 500 includes communication interface 502, processing system 504, and user interface 506. Processing system 504 includes storage system 508. Storage system 508 stores software 510. Processing system 504 is linked to communication interface 502 and user interface 506. Communications system 500 could be comprised of a programmed general-purpose computer, although those skilled in the art will appreciate that programmable or special purpose circuitry and equipment may be used. Communications system 500 may be distributed among multiple devices that together comprise elements 502-510.

Communication interface 502 could comprise a network interface, modem, port, transceiver, or some other communication device. Communication interface 502 may be distributed among multiple communication devices. Processing system 504 could comprise a computer microprocessor, logic circuit, or some other processing device. Processing system 504 may be distributed among multiple processing devices. User interface 506 could comprise a keyboard, mouse, voice recognition interface, microphone and speakers, graphical display, touch screen, or some other type of user device. User interface 506 may be distributed among multiple user devices. Storage system 508 could comprise a disk, tape, integrated circuit, server, or some other memory device. Storage system 508 may be distributed among multiple memory devices.

Processing system 504 retrieves and executes software 510 from storage system 508. Software 510 may comprise an operating system, utilities, drivers, networking software, and other software typically loaded onto a computer system. Software 510 could comprise an application program, firmware, or some other form of machine-readable processing instructions. When executed by processing system 504, software 510 directs processing system 504 to operate as described herein.

Figure 6:
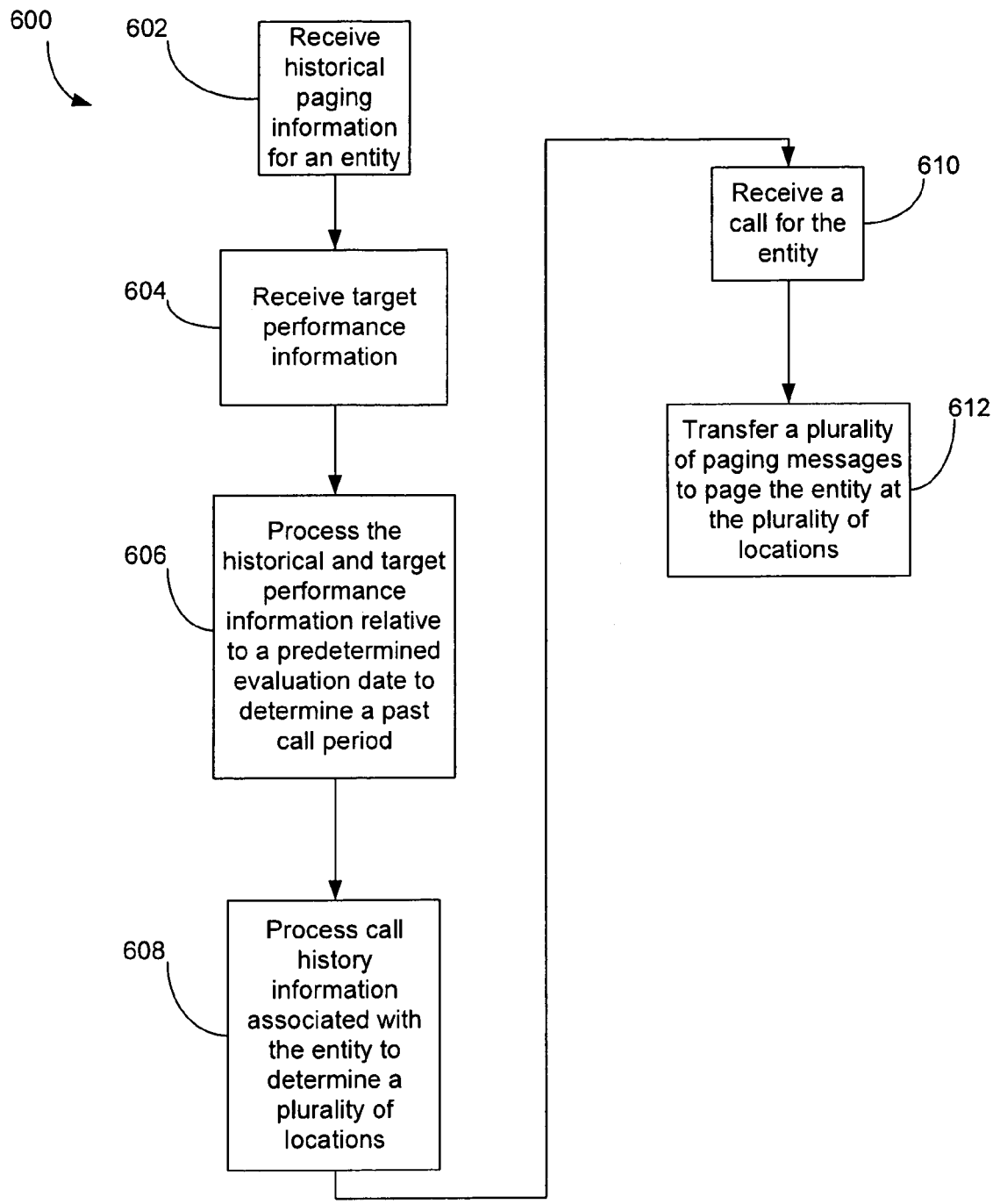
FIG. 6 is a flow diagram illustrating another embodiment of a method of operating a communication system as disclosed herein.

Communication system 500 may be implemented as part of a switching center 110 as shown in FIG. 1. Such a switching center may include any specialized equipment useful in using the embodiments shown herein FIG. 6 illustrates another embodiment of a method 600 of operating a communication system in accord with the disclosure herein. At step 602 a communication system receives historical performance information for an entity. The past call period information received at step 602 will be for a number of multiples of the predetermined time span.

At step 604 the communication system receives target performance information indicating a paging delay goal and a paging cost goal. At step 606 an evaluation date is determined according to which the historical performance information and the target performance information are processed to determine a past call period for the entity having a paging delay value that is within a predetermined proximity of the paging delay goal and a paging cost value that is within a predetermined proximity of the paging cost goal. Typically, the most recent call history information will be most probative of future locations of most call recipients, and thus the evaluation date will typically be the date the historical performance information and target performance information are processed. There may be, however, certain call recipients whose travel schedules place them on regular travel schedule such that the most recent 7 or 14 days of usage may prove to be completely unpredictable of future locations. In such an instance, the evaluation date can be chosen to coincide with such travel patterns as revealed in the call recipient's call history.

After identifying a past call period at step 606 that has a desired proximity to the paging cost and paging delay goals, then the call history information for the entity for that call period will be analyzed at step 608. The call history information will include the location(s) where the entity received calls during the call period in question. At step 610 the communication system receives a call for the entity and at step 612 transfers a plurality of paging messages to page the entity at the location(s) identified in step 608.

Furthermore, the evaluation date can be periodically changed. That is, it may be desirable to change the evaluation date to a daily evaluation such that the historical performance information and target performance information are processed for some entities on a daily basis.

Figure 7:
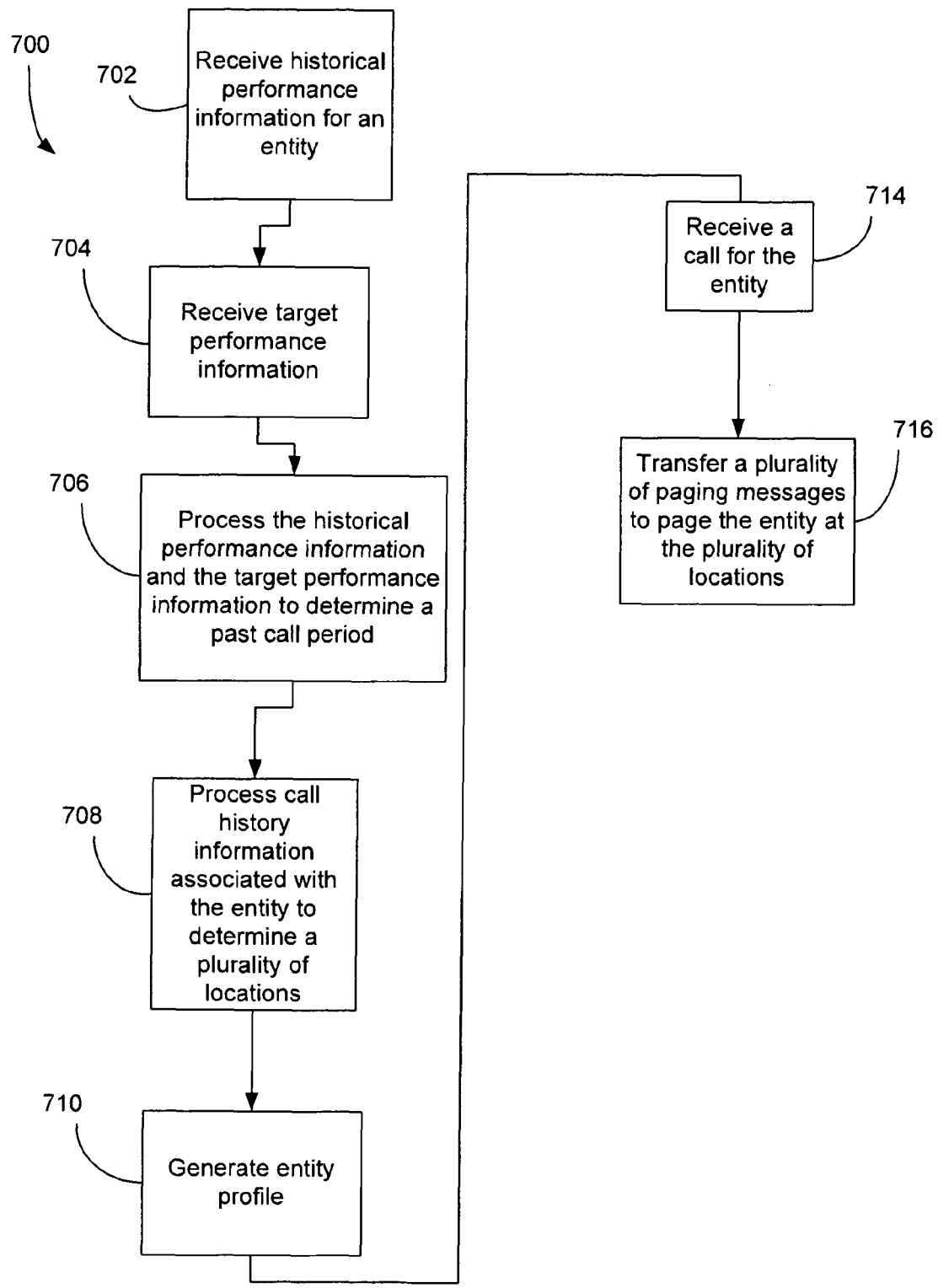
FIG. 7 is a flow diagram illustrating another embodiment of a method of operating a communication system as disclosed herein.

FIG. 7 illustrates another embodiment of a method 700 of operating a communication system in accord with the disclosure herein. At step 702 a communication system receives historical performance information for an entity. The past call period information received at step 702 will be for a number of multiples of the predetermined time span.

At step 704 the communication system receives target performance information indicating a paging delay goal and a paging cost goal. At step 706 an evaluation date is determined according to which the historical performance information and the target performance information are processed to determine a past call period for the entity having a paging delay value that is within a predetermined proximity of the paging delay goal and a paging cost value that is within a predetermined proximity of the paging cost goal. Typically, the most recent call history information will be most probative of future locations of most call recipients, and thus the evaluation date will typically be the date the historical performance information and target performance information are processed. There may be, however, certain call recipients whose travel schedules place them on regular travel schedule such that the most recent 7 or 14 days of usage may prove to be completely unpredictable of future locations. In such an instance, the evaluation date can be chosen to coincide with such travel patterns as revealed in the call recipient's call history.

After identifying a past call period at step 706 that has a desired proximity to the paging cost and paging delay goals, then the call history information for the entity for that call period will be analyzed at step 708. The call history information will include the location(s) where the entity received calls during the call period in question. At step 710 the communication system generates a profile for the entity that may include as much information as desired, but will at least include the locations identified at step 708. This profile may be stored at one or more MSC as shown and described with reference to FIG. 1 and may be updated at predetermined intervals as desired by the operator of the communication system. When the communication system receives a call for the entity at step 712, it may then consult the previously stored profile and transfer a plurality of paging messages to page the entity at the location(s) identified in step 708.

Figure 8:
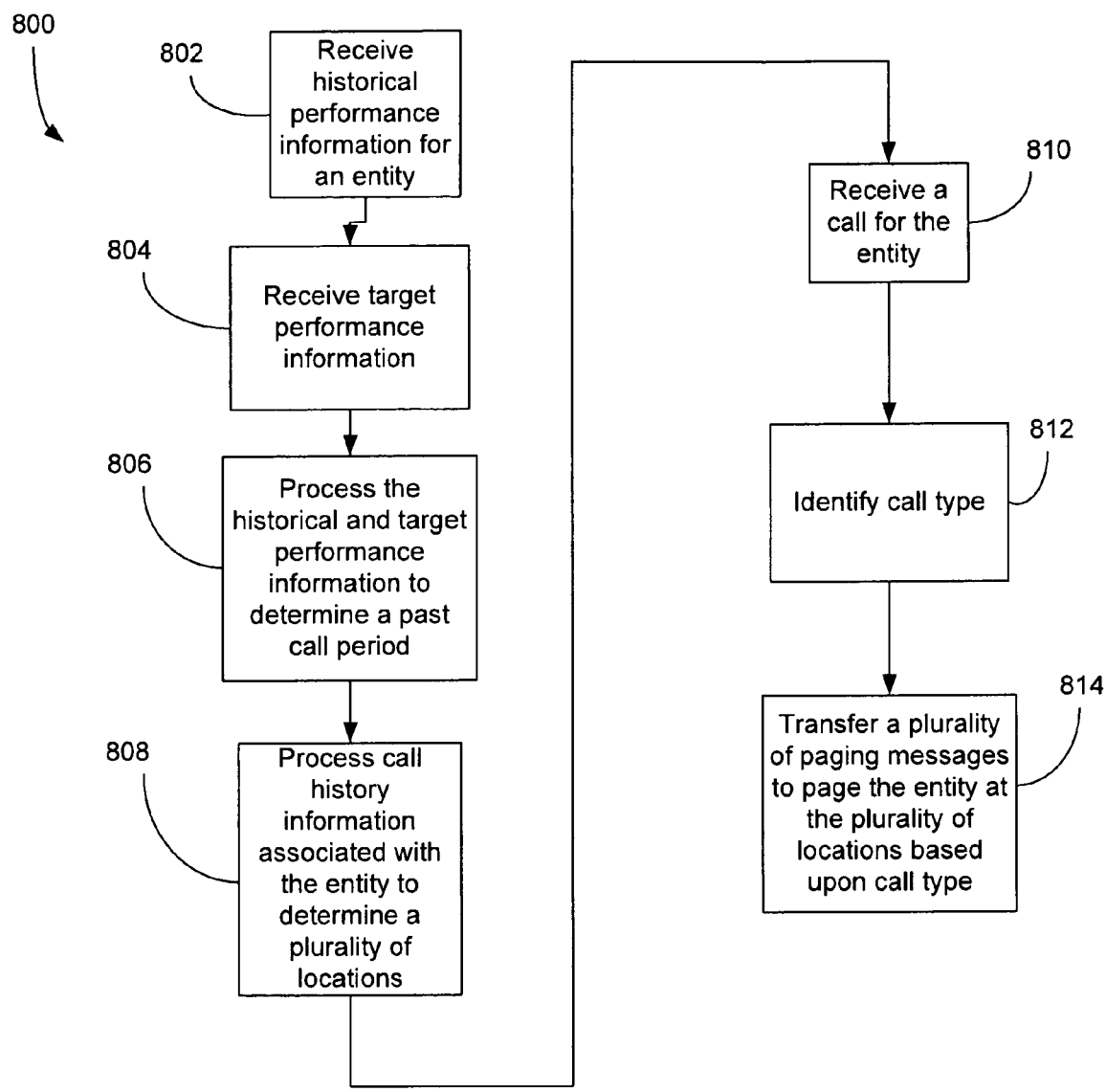
FIG. 8 is a flow diagram illustrating another embodiment of a method of operating a communication system as disclosed herein.

FIG. 8 illustrates another embodiment of a method 800 of operating a communication system in accord with the disclosure herein. At step 802 a communication system receives historical performance information for an entity. The past call period information received at step 802 will be for a number of multiples of the predetermined time span.

At step 804 the communication system receives target performance information indicating a paging delay goal and a paging cost goal. At step 806 an evaluation date is determined according to which the historical performance information and the target performance information are processed to determine a past call period for the entity having a paging delay value that is within a predetermined proximity of the paging delay goal and a paging cost value that is within a predetermined proximity of the paging cost goal. Typically, the most recent call history information will be most probative of future locations of most call recipients, and thus the evaluation date will typically be the date the historical performance information and target performance information are processed. There may be, however, certain call recipients whose travel schedules place them on regular travel schedule such that the most recent 7 or 14 days of usage may prove to be completely unpredictable of future locations. In such an instance, the evaluation date can be chosen to coincide with such travel patterns as revealed in the call recipient's call history.

After identifying a past call period at step 806 that has a desired proximity to the paging cost and paging delay goals, then the call history information for the entity for that call period will be analyzed at step 808. The call history information will include the location(s) where the entity received calls during the call period in question. At step 810 the communication system receives a call for the entity.

At step 812 the communication system determines the type of call that has been received for the entity. That is, the communication system will determine whether the incoming call is a voice call, a data call, or a short message service (SMS) call. In accord with an embodiment of the method described herein the communication system can evaluate call history locations based upon the type of call and can send pages accordingly. For example, based upon the experience of the operation of the communication system it may be determined that certain call types provide more reliable location predictions. Data calls, for example, are often received in response to a call initially placed by the call recipient. Thus, the most recent locations of the call recipient are highly indicative of location. Thus, when an incoming call is a data call, the communication system can place paging calls at step 814 to page the call recipient at the last N most recently visited cells of those locations identified at step 808, where N is a variable determined by the operator of the communication system based upon call recipient history, entity, system needs, geographic location, or any other factor or combination of factors deemed relevant to operation of the system.

Incoming voice and SMS calls are less predictive of location than data calls. Thus, when the incoming call is a voice or SMS call the communication system may at step 814 transfer a plurality of paging messages to page the entity at the N most recently visited cells and the top X fraction of most visited cells by the user as those locations are identified at step 808. Once again, N and X are parameters that may be selected by the operators of the communication system based upon any one or combination of the previously mentioned factors.

Figure 9:
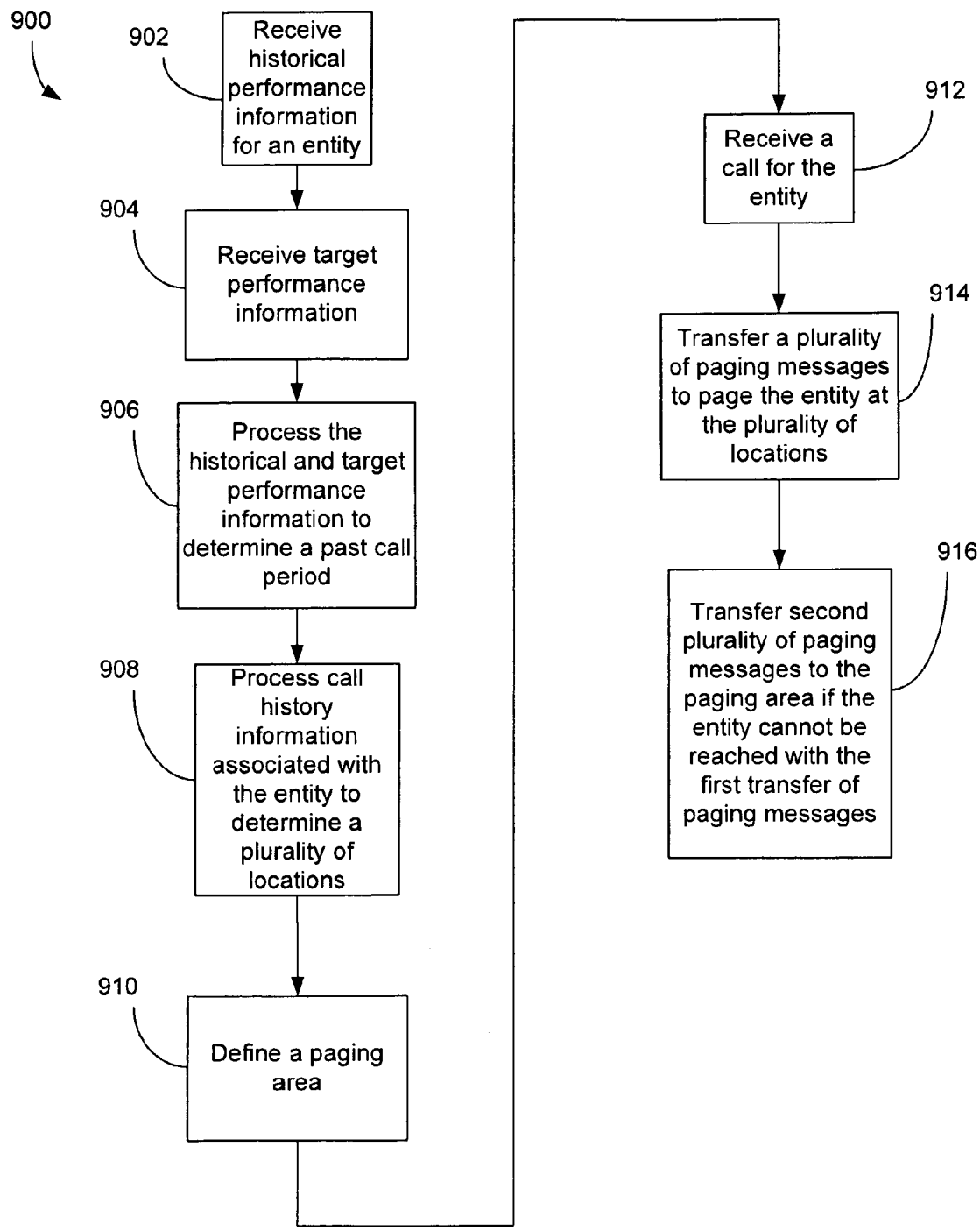
FIG. 9 is a flow diagram illustrating another embodiment of a method of operating a communication system as disclosed herein.

FIG. 9 illustrates another embodiment of a method 900 of operating a communication system in accord with the disclosure herein. At step 902 a communication system receives historical performance information for an entity. The past call period information received at step 902 will be for a number of multiples of the predetermined time span.

At step 904 the communication system receives target performance information indicating a paging delay goal and a paging cost goal. At step 906 the historical performance information and the target performance information are processed to determine a past call period for the entity having a paging delay value that is within a predetermined proximity of the paging delay goal and a paging cost value that is within a predetermined proximity of the paging cost goal. Typically, the most recent call history information will be most probative of future locations of most call recipients, and thus the evaluation date will typically be the date the historical performance information and target performance information are processed. There may be, however, certain call recipients whose travel schedules place them on regular travel schedule such that the most recent 7 or 14 days of usage may prove to be completely unpredictable of future locations. In such an instance, the evaluation date can be chosen to coincide with such travel patterns as revealed in the call recipient's call history.

After identifying a past call period at step 906 that has a desired proximity to the paging cost and paging delay goals, then the call history information for the entity for that call period will be analyzed at step 908. The call history information will include the location(s) where the entity received calls during the call period in question. At step 910 the communication system receives a call for the entity and at step 912 transfers a plurality of paging messages to page the entity at the location(s) identified in step 908.

Typically the number of cells to be paged will be a small number of the cells in the network. If the intended call recipient is not located within those cells, then the communication system may initiate a second round of paging at step 916. To keep paging delay down, the second round of paging may encompass the remainder of the cells within the network, or perhaps even all of them, though the number of cells paged in this second round of paging is configurable by the operator of the communication network. By way of example only, referring to FIG. 1, if it should be determined that the analysis of historical performance information and target performance information for mobile station 106*a* indicates cells 102*a*, 102*c* and 102*d* are the locations that should be paged first, then a page will be sent to those cells. If mobile station 106*a* is not found within those cells, then the remainder of the cells in the network can be paged in a second round of paging. Alternatively, some other criteria may be used to determine a second round of paging, such as all cells within the mobile station's area code or billing address, and, if the cell is not found within those cells, a third and subsequent rounds of paging can be initiated. Of course, multiple rounds of paging increases paging delays, which can provide unsatisfactory customer experiences as previously mentioned.

As has been discussed with the various embodiments, the various paging goals and other variables discussed herein can be determined by the communications system operator based upon consideration of numerous factors. Included among those previously mentioned are network traffic in particular areas, network capacity, geographical and environmental considerations, and particular network equipment at various MSCs or BSCs.

The above description and associated figures teach the best mode of the invention. The following claims specify the scope of the invention. Note that some aspects of the best mode may not fall within the scope of the invention as specified by the claims. Those skilled in the art will appreciate that the features described above for the various embodiments can be combined in various ways to form multiple variations of the invention. As a result, the invention is not limited to the specific embodiments described above, but only by the following claims and their equivalents.

What is claimed is:

1. A method of operating a communication system, the method comprising:

receiving historical performance information for an entity, wherein the historical performance information includes a paging delay value and a paging cost value for each of a plurality of past call periods;

receiving target performance information indicating a paging delay goal and a paging cost goal;

processing the historical performance information and the target performance information to determine a past call period, wherein the past call period comprises one of the plurality of past call periods having a paging delay value that is within a predetermined proximity of the paging delay goal and a paging cost value that is within a predetermined proximity of the paging cost goal;
processing call history information associated with the entity to determine a plurality of locations where the entity was located during the past call period;
receiving a call for the entity; and
in response to the call, identifying the call as a voice call and transferring a plurality of paging messages only to the last N most recently visited locations of the plurality of locations and the top X fraction of most visited cells by the entity, where N and X are predetermined numbers, to page the entity.

2. The method of claim 1 and further comprising determining an evaluation date for processing the historical performance information and the target performance information and wherein each of the past call periods comprises a predetermined number of a predetermined time period immediately preceding the evaluation date.

3. The method of claim 2 wherein the predetermined time period is a day.

4. The method of claim 1 and further comprising generating an entity profile comprising an entity identifier and the plurality of locations.

5. The method of claim 4 and further comprising generating an entity profile for a plurality of entities.

6. The method of claim 4 and further comprising updating the entity profile on a predetermined schedule.

7. The method of claim 4 and further comprising storing the entity profile at least one mobile switching center of the communication system.

8. The method of claim 4 and further comprising identifying the call by type.

9. The method of claim 1 and further comprising:
defining a paging area; and
transferring a second plurality of paging messages to page the entity in the paging area if the entity cannot be reached at one of the plurality of locations.

10. The method of claim 1 wherein at least one of the paging delay goal and the paging cost goal is a range of values.

11. The method of claim 1 and further comprising identifying the call by type.

12. A communications system, the system comprising an interface and a processing system comprising a storage system and software for directing operation of the processing system, wherein the interface is configured:
to receive historical performance information for an entity, wherein the historical performance information includes a paging delay value and a paging cost value for each of a plurality of past call periods; and
to receive target performance information indicating a paging delay goal and a paging cost goal;
and wherein the processing system is configured:
to process the historical performance information and the target performance information to determine a profile past call period, wherein the past call period comprises one of the plurality of past call periods having a paging delay value that is within a predetermined proximity of the paging delay goal and a paging cost value that is within a predetermined proximity of the paging cost goal;
to process call history information associated with the entity to determine a plurality of locations where the entity was located during the past call period;
to receive a call for the entity; and
in response to the call, to identify the call as a voice call and to transfer a plurality of paging messages only to the last N most recently visited locations of the plurality of locations and the top X fraction of most visited cells by the entity, where N and X are predetermined numbers, to page the entity.

13. The communication system of claim 12 wherein the processing system is further configured to process the historical performance information and the target performance information on a predetermined evaluation date, wherein each of the past call periods comprises a predetermined number of a predetermined time period immediately preceding the evaluation date.

14. The communication system of claim 13 wherein the predetermined time period is a day.

15. The communication system of claim 12 wherein the processing system is further configured to generate an entity profile comprising an entity identifier and the plurality of locations.

16. The communication system of claim 15 wherein the processing system is further configured to generate an entity profile for a plurality of entities.

17. The communication system of claim 15 wherein the processing system is further configured to update the entity profile on a predetermined schedule.

18. The communication system of claim 15 wherein the processing system is further configured to store the entity profile at least one mobile switching center of the communication system.

19. The communication system of claim 15 wherein the processing system is further configured to identify the call by type.

20. The communication system of claim 12 wherein the processing system is further configured to transfer a second plurality of paging messages to page the entity in the paging area if the entity cannot be reached at one of the plurality of locations, wherein the paging area is predefined.

21. The communication system of claim 12 wherein at least one of the paging delay goal and the paging cost goal is a range of values.

22. The communication system of claim 12 wherein the processing system is further configured to identify the received call by type.

23. A computer software product for operating a paging system, the product comprising a non-transitory computer readable medium having instructions stored thereon for operating a paging system, wherein the instructions when executed by the paging system, direct the paging system comprising instructions for causing a computer:
to receive historical performance information for an entity, wherein the historical performance information includes a paging delay value and a paging cost value for each of a plurality of past call periods;
to receive target performance information indicating a paging delay goal and a paging cost goal;
to process the historical performance information and the target performance information to determine a past call period, wherein the past call period comprises one of the plurality of past call periods having a paging delay value that is within a predetermined proximity of the paging delay goal and a paging cost value that is within a predetermined proximity of the paging cost goal;
to process call history information associated with the entity to determine a plurality of locations where the entity was located during the past call period;
to receive a call for the entity; and
in response to the call for the entity, to identify the call as a voice call and to transfer a plurality of paging messages only to the last N most recently visited locations of the plurality of locations and the top X fraction of most visited cells by the entity, where N and X are predetermined numbers, to page the entity.

* * * * *